(12) United States Patent
Cai et al.

(10) Patent No.: US 10,527,454 B2
(45) Date of Patent: Jan. 7, 2020

(54) MAGNET SENSOR, MOTOR ASSEMBLY AND APPLICATION APPARATUS

(71) Applicant: Johnson Electric S.A., Murten (CH)

(72) Inventors: Guang Jie Cai, Hong Kong (CN); Chun Fai Wong, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 407 days.

(21) Appl. No.: 15/475,839

(22) Filed: Mar. 31, 2017

(65) Prior Publication Data

US 2017/0284829 A1 Oct. 5, 2017

(30) Foreign Application Priority Data

Apr. 1, 2016 (CN) .......................... 2016 1 0203285
Jun. 3, 2016 (CN) .......................... 2016 1 0389973

(51) Int. Cl.
*G01D 5/14* (2006.01)
*H02K 19/02* (2006.01)

(52) U.S. Cl.
CPC ............ *G01D 5/142* (2013.01); *H02K 19/02* (2013.01)

(58) Field of Classification Search
CPC .......... G01D 5/14; G01D 5/142; G01D 5/145; G01D 5/147; G01D 5/485; H02K 19/00; H02K 29/08; H02K 11/215
See application file for complete search history.

(56) References Cited

U.S. PATENT DOCUMENTS

| 7,358,880 B1* | 4/2008 | Melanson | G01D 5/145 341/143 |
| 2003/0020470 A1* | 1/2003 | Hatanaka | G01D 3/02 324/251 |
| 2012/0223704 A1* | 9/2012 | Hayashi | G01R 33/0023 324/244 |
| 2014/0028286 A1* | 1/2014 | Hu | G01R 15/202 324/117 H |

FOREIGN PATENT DOCUMENTS

JP 2014066522 A 4/2014

* cited by examiner

*Primary Examiner* — Son T Le
(74) *Attorney, Agent, or Firm* — Muncy, Geissler, Olds & Lowe, P.C.

(57) ABSTRACT

A magnetic sensor, a motor and an application apparatus are provided. The magnetic sensor includes a magnetic sensing element, a chopping switch, a first discharging branch, and a second discharge branch. The magnetic sensing element includes a first terminal, a second terminal, a third terminal, and a fourth terminal. The first discharging branch is coupled between the first terminal and the third terminal. The second discharging branch is coupled between the second terminal and the fourth terminal. Before the first terminal and the third terminal serve as power input terminals, the second terminal and the fourth terminal serve as output terminals of magnetic field detection signal, the second discharging branch is turned on; before the first terminal and the third terminal serve as the magnetic field detection signal output terminals, the second terminal and the fourth terminal serve as power input terminals, the first discharging branch is turned on.

14 Claims, 7 Drawing Sheets

MAGNET SENSOR, MOTOR ASSEMBLY AND APPLICATION APPARATUS

CROSS REFERENCE TO RELATED APPLICATIONS

This non-provisional patent application claims priority under 35 U.S.C. § 119(a) from Patent Application No. 201610203285.8 filed in the People's Republic of China on Apr. 1, 2016 and 201610389973.8 filed in the People's Republic of China on Jun. 3, 2016.

FIELD

The present disclosure relates to magnetic field detection, more particularly, to a magnetic sensor, a motor assembly and an application apparatus.

BACKGROUND

Magnetic sensors are widely applied in modern industries and electronic products to induce a magnetic field strength for measuring physical parameters such as current, position and direction. The motor is an important application field of magnetic sensor. The magnetic sensor may serve as a rotor magnetic-pole position sensor in the motor.

In general, the magnetic sensor can only output a magnetic field detection signal. However, the magnetic field detection signal is weak and mixed with offset of the magnetic sensor; it's difficult to obtain an accurate magnetic field detection signal.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF EMBODIMENTS

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

As described in the Background section, in the conventional technologies, generally, a magnetic sensor integrated circuit can only output a magnetic field detection result, and an additional peripheral circuit is required to process the magnetic detection result. Therefore, the whole circuit has a high cost and a poor reliability.

Figure 1:
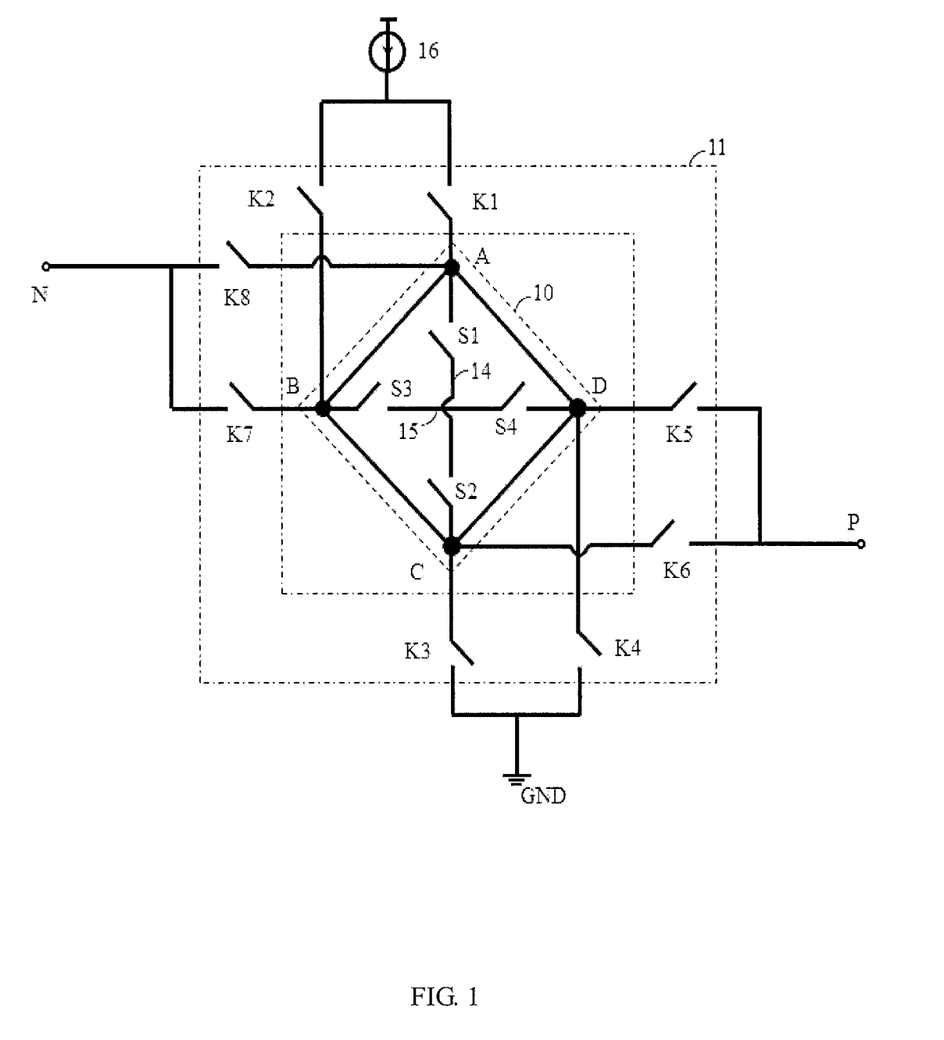
FIG. 1 is a block diagram of a magnetic sensor according to one embodiment.

FIG. 1 shows a block diagram of a magnetic sensor according to one embodiment. The magnetic sensor 100 can include a magnetic sensing element 10, which is a circuit diagram surrounded a dotted line if FIG. 1. The magnetic sensing element 10 can include four contact terminals. The magnetic sensing element 10 includes a first terminal A and a third terminal C which are arranged oppositely, and a second terminal B and a fourth terminal D which are arranged oppositely. In the embodiment, the magnetic sensing element 10 can be a Hall plate. The magnetic sensing element 10 is driven by a power source 16.

The magnetic sensor can further include a chopping switch 11. The chopping switch 11 can include eight switches: K1 to K8, which are electrically connected to the four terminals to modulate a magnetic field detection signal output by the magnetic sensing element 10. Specifically, the magnetic field detection signal includes a magnetic field signal and an offset signal; the chopping switch 11 modulates the magnetic field signal and the offset signal to a chopping frequency and a baseband frequency, respectively.

The chopping switch 11 can include eight switches: K1 to K8 as shown in FIG. 1. Specifically, the chopping switch 11 includes a first switch K1, a second switch K2, a third switch K3, a fourth switch K4, a fifth switch K5, a sixth switch K6, a seventh switch K7 and an eighth switch K8. The first switch K1 is electrically connected between the power source 16 and the first terminal A. The second switch K2 is electrically connected between the power source 16 and the second terminal B. The third switch K3 is electrically connected between a grounded end GND and the third terminal C. The fourth switch K4 is electrically connected between the grounded end GND and the fourth terminal D. The fifth switch K5 is electrically connected between a first output terminal P and the fourth terminal D. The sixth switch K6 is electrically connected between the first output terminal P and the third terminal C. The seventh switch K7 is electrically connected between a second output terminal N and the second terminal B. The eighth switch K8 is electrically connected between the second output terminal N and the first terminal A.

The first clock signal includes a first sub clock signal CK2B, a second sub clock signal CK1B, a third clock signal CK2 and a fourth sub clock signal CK1. The first switch K1 and the second switch K2 are respectively controlled by the first sub clock signal CK2B and the second sub clock signal CK1B. The third switch K3 and the fourth switch K4 are respectively controlled by the third sub clock signal CK2 and the fourth sub clock signal CK1. The fifth switch K5 and the sixth switch K6 are respectively controlled by the third sub clock signal CK2 and the fourth sub clock signal CK1. The seventh switch K7 and the eighth switch K8 are respectively controlled by the third sub clock signal CK2 and the fourth sub clock signal CK1.

In order to ensure an accuracy of an output signal, the first clock signal includes at least two non-overlapping sub clock signals. A phase of the first sub clock signal CK2B is opposite to a phase of the third sub clock signal CK2, and a phase of the second sub clock signal CK1B is opposite to a phase of the fourth sub clock signal CK1. The third sub clock signal CK2 and the fourth sub clock signal CK1 are non-overlapping sub clock signals.

When the first terminal A is electrically connected to the power source 16 and the third terminal C is electrically connected to the grounded end GND, the second terminal B is electrically connected to the second output terminal N and the fourth terminal D is electrically connected to the first output terminal P. When the second terminal B is electrically connected to the power source 16 and the fourth terminal D is electrically connected to the grounded end GND, the first terminal A is electrically connected to the second output terminal N and the third terminal C is electrically connected to the first output terminal P. The first output terminal P outputs a differential signal P1, and the second output terminal N outputs a differential signal N1.

Besides the magnetic sensor and the chopping switch 11 described, the magnetic sensor further includes a first discharging branch 12 electrically connected between the first terminal A and the third terminal C, i.e. a branch between the first terminal A and the third terminal C, and a second discharging branch 13 electrically connected between the second terminal B and the fourth terminal D, i.e. a branch between the second terminal B and the fourth terminal D. Before the first terminal A and the third terminal C serve as power input terminals and the second terminal B and the fourth terminal D serve as magnetic sensed signal output terminals, the second discharging branch 13 is turned on. Before the first terminal A and the third terminal C serve as magnetic sensed signal output terminals and the second terminal B and the fourth terminal D serve as power input terminals, the first discharging branch 13 is turned on.

In the embodiment, the first discharging branch 12 may include a first discharging switch S1 and a second discharging switch S2 which are electrically connected in series. The first discharging switch S1 and the second discharging switch S2 are respectively controlled by the first sub clock signal CK2B and the second sub clock signal CK1B. The second discharging branch 13 includes a third discharging switch S3 and a fourth discharging switch S4 which are electrically connected in series. The third discharging switch S3 and the fourth discharging switch S4 are respectively controlled by the first sub clock signal CK2B and the second sub clock signal CK1B.

When the first terminal A and the third terminal C serve as power input terminals and the second terminal B and the fourth terminal D serve as output terminals of the magnetic field signal, during a period that the first sub clock signal CK2B overlaps with the second sub clock signal CK1B, the first discharging switch S1 and the second discharging switch S2 are simultaneously turned on. When the first terminal A and the third terminal C serve as output terminals of the magnetic field signal and the second terminal B and the fourth terminal D serve as power input terminals, during a period that the first sub clock signal CK2B overlaps with the second sub clock signal CK1B, the third discharging switch S3 and the fourth discharging switch S4 are simultaneously turned on.

Figure 2:
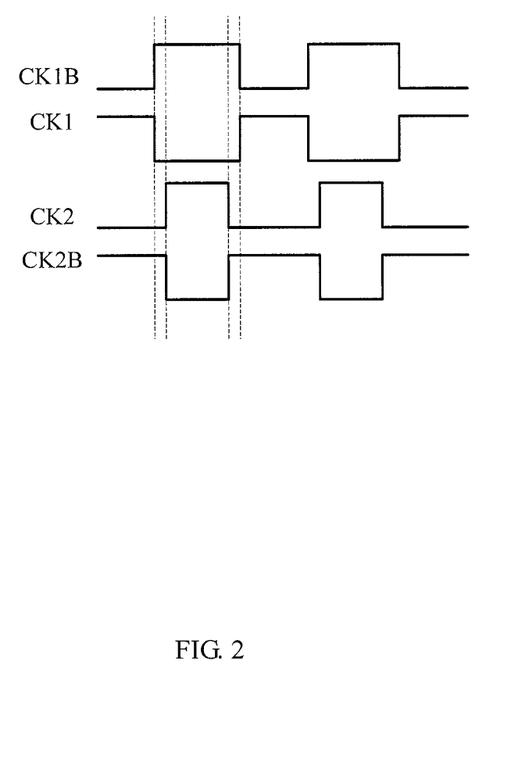
FIG. 2 is a time-sequence diagram of four control signals of the magnetic sensor FIG. 1.

As shown in FIG. 2, the four sub clock signals includes two non-overlapping control signals, i.e. the third sub clock signal CK1 and the fourth sub clock signal CK2, and two overlapping control signals, i.e. the second sub clock signal CK1B and the first sub clock signal CK2B. CK1 is opposite to CK1B and CK2 is opposite to CK2B. The overlapping sub clock signals CK1B and CK2B are both at a high level during the period in which CK1B overlaps with CK2B, i.e., a period of time between two dotted lines as shown in FIG. 2. The two non-overlapping sub clock signals CK1 and CK2 and the two overlapping sub clock signals CK1B and CK2B may have a frequency ranging from 100 KHz to 600 KHz inclusively, and preferably may have a frequency of 400 KHz.

Figure 3:
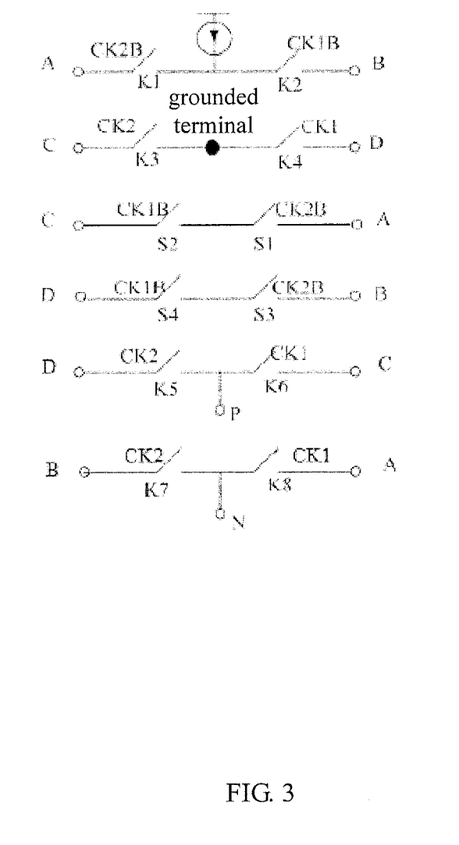
FIG. 3 is a schematic diagram of control signals of a discharging switch and a chopping switch of FIG. 1.

FIG. 3 shows a schematic diagram of control signals of a discharging switch and a chopping switch. In the embodiment of the present disclosure, the eight switches included in the chopping switch 11 and the four discharging switches included in the discharging branches each may be a transistor. When CK1 is high level, CK2B is high level, and CK2 and CK1B are low level. In such case, the second terminal B and the fourth terminal D are respectively electrically connected to the power source 16 and the grounded end GND and serve as the power input terminals, the switches between the third terminal C and the first output terminal P are turned on, the switches between the first terminal A and the second output N are turned on, and the first terminal A and the third terminal C serve as output terminals of the magnetic field signal. A short period of time just after transition of CK1 from the high level to the low level, i.e. a period of time between the first two dotted lines as shown in FIG. 2, is an overlapping period of the two overlapping sub clock signals CK1B and CK2B. In the overlapping period, CK1B and CK2B are both high level, the third discharging switch S3 and the fourth discharging switch S4 between the second terminal B and the fourth terminal D are simultaneously turned on, and the second terminal B is short-circuited with the fourth terminal D thereby eliminating charges stored in a parasitic capacitor between the second terminal B and the fourth terminal D. After the overlapping period, when CK1 is low level, CK2B is low level, and CK2 and CK1B are high level. In this case, the first terminal A and the third terminal C are respectively electrically connected to the first power and the grounded end GND and serve as power input terminals, the switches between the second terminal B and the first output terminal P are turned on, the switches between the fourth terminal D and the second output terminal N are turned on, and the second terminal B and the fourth terminal D serve as output terminals of the magnetic field signal. A short period of time just before transition of CK1 from the low level to the high level, i.e. a period of time between the second two dotted lines as shown in FIG. 2, is an overlapping period of the two sub clock signals CK1B and CK2B. In this period, CK1B and CK2B are both high level, the first discharging switch S1 and the second discharging switch S2 between the first terminal A and the third terminal C are turned on, and the terminal A is short-circuited with the third terminal C, thereby eliminating charges stored in a parasitic capacitor between the first terminal A and the third terminal C.

In the embodiment, the first switch K1 and the second switch K2 are PMOS transistors; the third switch K3 and the fourth switch K4 are NMOS transistors.

Figure 4:
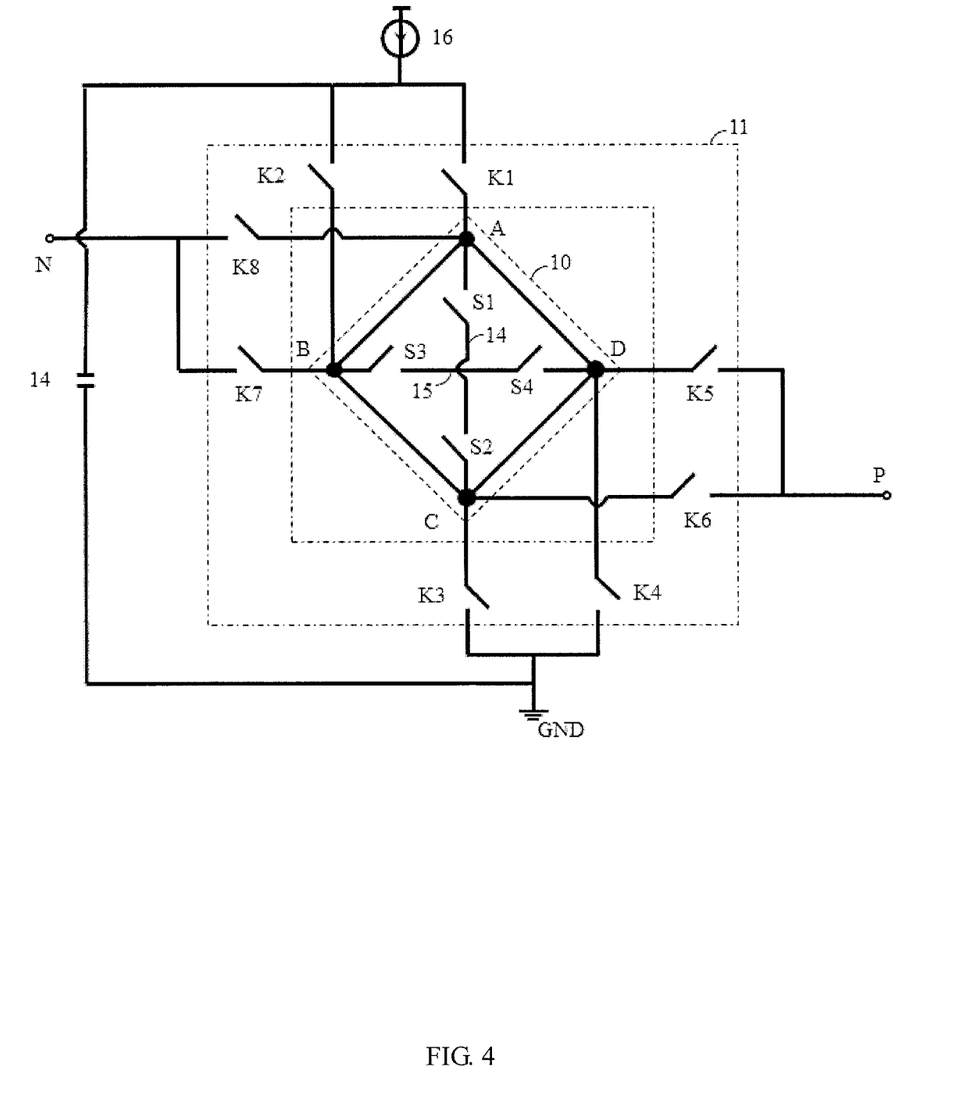
FIG. 4 is a block diagram of a magnetic sensor according to another embodiment.

FIG. 4 shows a magnetic sensor according to another embodiment. The magnetic sensor of FIG. 4 is similar to the magnetic sensor of FIG. 1, except that the magnetic sensor further includes a capacitor 14 coupled between the power source 16 and the ground terminal (common terminal).

In the embodiment, the power source 16 can be a constant voltage source or a constant current source. When the magnetic sensing element 10 is driven by the constant current source, a sensing sensitivity of the magnetic sensor does not change with temperature.

In the embodiment, the capacitor 14 can provide a constant voltage. When the input/output terminal is switched, the capacitor 14 can pull up the voltage of the input terminal to ensure a good performance of the magnetic sensor.

In the embodiment, a capacitance of the capacitor 14 can be tens of pF and the capacitance of the capacitor 14 is greater than a capacitance of the parasitic capacitor between the contact terminals.

In the embodiment, the capacitor 14 can be a MOS capacitor.

Figure 5:
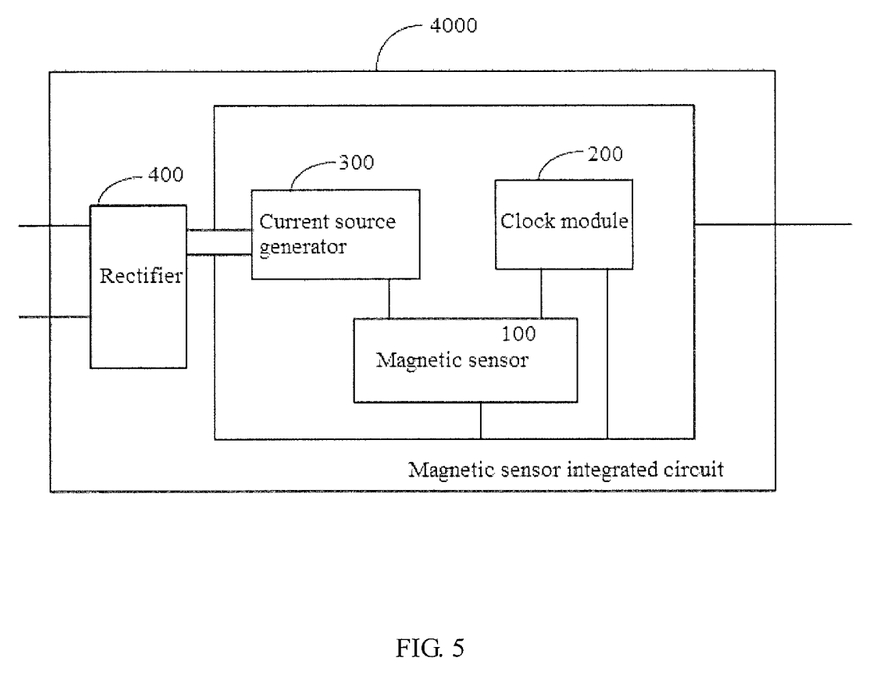
FIG. 5 is a block diagram of a magnetic sensor integrated circuit according to one embodiment.

FIG. 5 shows a block diagram of a magnetic sensor integrated circuit 4000 according to an embodiment. The magnetic sensor integrated circuit 4000 is electrically coupled to an AC power supply and outputs a control signal to a triode alternating current switch (TRIAC) according to a polarity of a magnetic field. The magnetic sensor integrated circuit 4000 can include a rectifier 400, a current source generator 300, a magnetic sensor 100 and a clock module 200. The rectifier 400 can convert an external power into a direct-current (DC) power to the magnetic sensor and the clock module. The current source generator 300 can output a plurality of current having different values according to the DC power. The magnetic sensor 100 as shown in FIG. 1 can sense a polarity of an external magnetic field and output the control signal. The clock module 200 can output a plurality of clock signals to the magnetic sensor.

Figure 6:
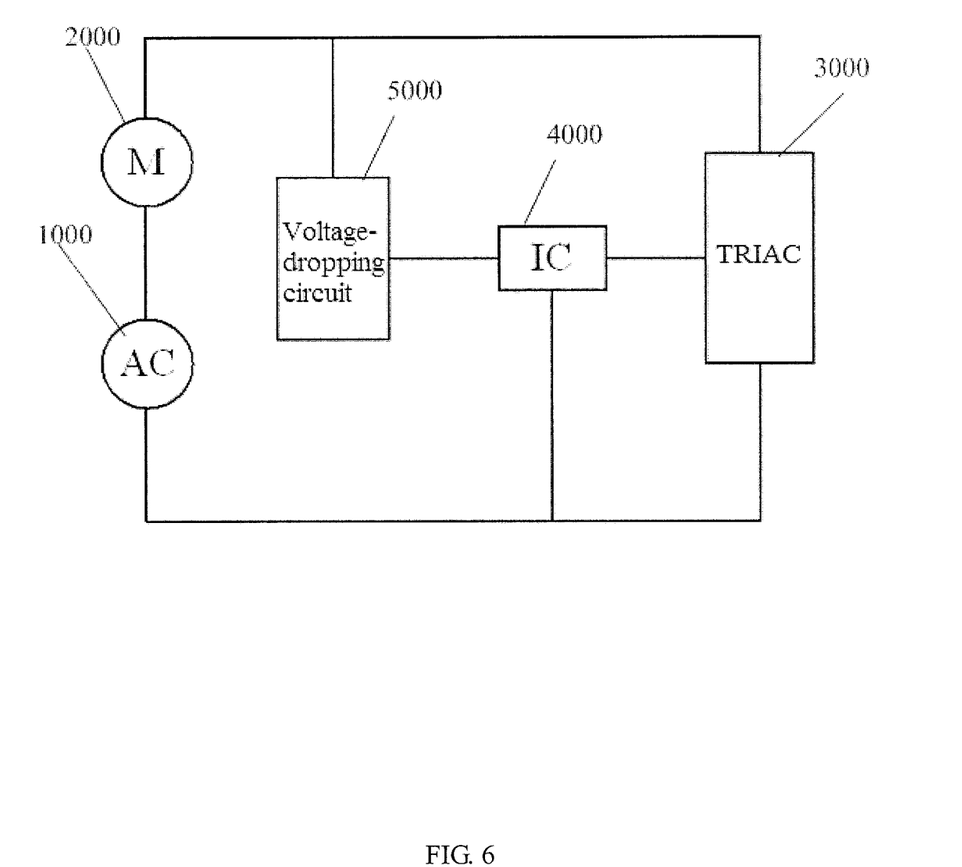
FIG. 6 is a schematic structural diagram of a circuit of a motor assembly according to an embodiment of the present disclosure.

As shown in FIG. 6, a motor assembly is further provided according to an embodiment of the present disclosure. The motor assembly includes an motor 2000 powered by an alternating-current power 1000, a bidirectional conducting switch 3000 electrically connected to the motor 2000 in series, and a magnetic sensor integrated circuit 4000 according to any one of the above embodiments of the present disclosure. An output port of the magnetic sensor integrated circuit 4000 is electrically connected to a control end of the bidirectional conducting switch 3000. Preferably, the bidirectional conducting switch 3000 may be a triode alternating current switch (TRIAC). It can be understood that, the bidirectional conducting switch may be implemented with other suitable types of switches. For example, the bidirectional conducting switch may include two silicon controlled rectifiers electrically connected in reverse parallel and a corresponding control circuit. The two silicon controlled rectifiers are controlled by the control circuit in a predetermined manner based on an output signal output by the output port of the magnetic sensor integrated circuit.

Preferably, the motor further includes a voltage-dropping circuit 5000 to drop the voltage of the alternating-current power 1000 and provide the dropped voltage to the magnetic sensor integrated circuit 4000. The magnetic sensor integrated circuit 4000 is arranged in proximity to a rotor of the motor 2000 to sense a change of a magnetic field of the rotor.

Figure 7:
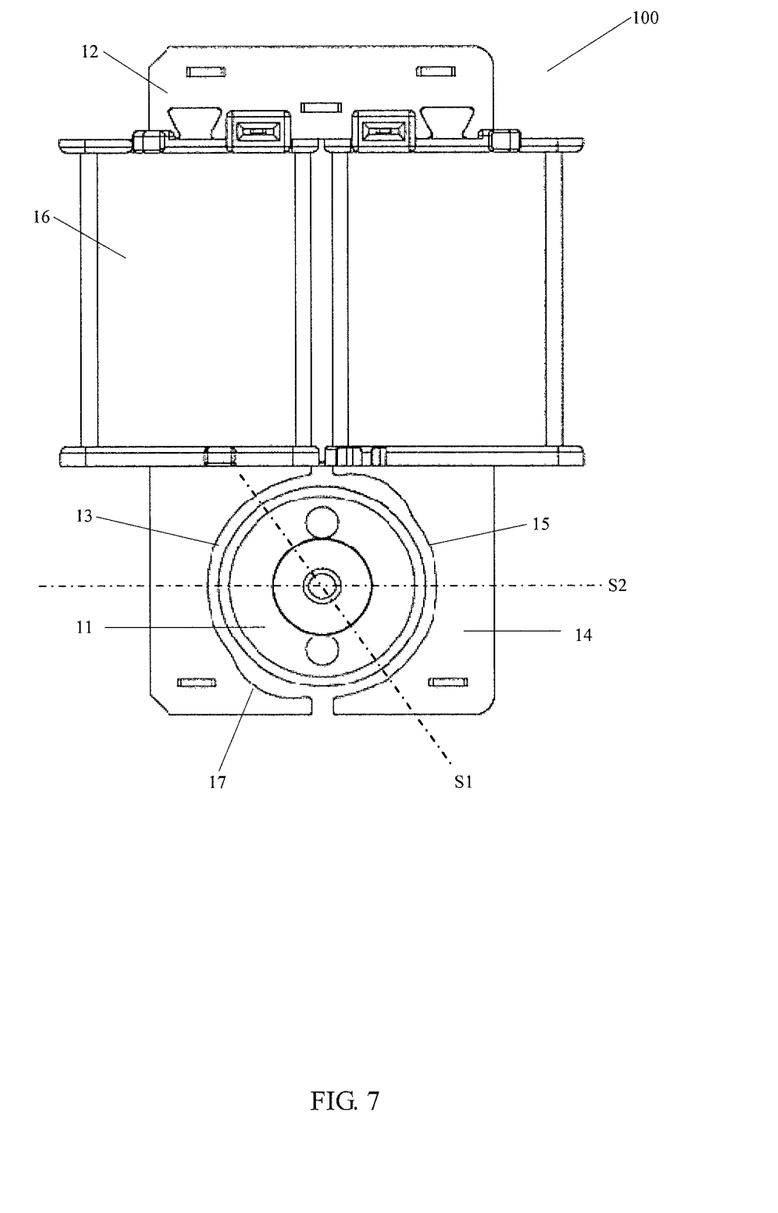
FIG. 7 is a schematic structural diagram of a synchronous motor according to an embodiment of the present disclosure.

Based on the above embodiment, in an embodiment of the present disclosure, the motor is a synchronous motor. It can be understood that, the magnetic sensor integrated circuit according to the present disclosure is not only applied in the synchronous motor, but also applied in other types of permanent magnet motor such as direct-current brushless motor. As shown in FIG. 7, the synchronous motor includes a stator and a rotor 1001 rotating with respect to the stator. The stator includes a stator core 1002 and a stator winding 1006 wound around the stator core 1002. The stator core 1002 may be made of soft magnetic material such as pure iron, cast iron, cast steel, electrical steel and silicon steel. The rotor 1001 includes a permanent magnet. When the stator winding 1006 is electrically connected to the alternating current power in series, the rotor 1001 rotates with a constant speed of a constant rotation rate of (60 f/p) revolutions per minute (RPM) in a steady state, where f is a frequency of the alternating-current power, and p is a number of pole-pairs of the rotor. In the embodiment, the stator core 1002 has two pole portions 1004 arranged oppositely. Each of the pole portions has a polar arc surface 1005. An external surface of the rotor 1001 faces the polar arc surface 1005, and a substantially uniform air gap is formed therebetween. The basically uniform air gap in the present disclosure indicates that majority of the air gap between the stator and the rotor is uniform, and minority of the air gap between the stator and the rotor is non-uniform. Preferably, a concave starting groove 1007 is arranged on the polar arc surface 1005 of the pole portion of the stator. Portions other than the starting groove 1007 on the polar arc surface 1005 are concentric with the rotor. With the above configurations, a non-uniform magnetic field may be formed which ensures that when the rotor does not rotate, a polar axis S1 of the rotor is tilted with an angle with respect to a central axis S2 of the pole portion of the stator, so that the rotor can have a starting torque each time when the motor is powered on under an effect of the integration circuit. The polar axis S1 of the rotor is a boundary between two magnetic poles of the rotor with different polarities. The central axis S2 of the pole portion 1004 of the stator is a connection line passing through centers of the two pole portions 1004 of the stator. In the embodiment, the stator and the rotor each have two magnetic poles. It can be understood that, in other embodiments, the number of magnetic poles of the stator may be different from the number of magnetic poles of the rotor, and the stator and the rotor may have more magnetic poles such as four magnetic poles and six magnetic poles.

Accordingly, an application apparatus is further provided according to an embodiment of the present disclosure. The application apparatus includes a motor powered by an alternating-current power, a bidirectional conducting switch electrically connected to the motor in series, and the magnetic sensor integrated circuit according to any one of the above embodiments. An output port of the magnetic sensor integrated circuit is electrically connected to a control end of the bidirectional conducting switch. Optionally, the application apparatus may be a pump, a fan, a household appliance, a vehicle and the like, where the household appliance, for example, may be a washing machine, a dishwasher, a range hood, an exhaust fan and the like.

With the above descriptions of the disclosed embodiments, those skilled in the art may achieve or use the present disclosure. Various modifications to the embodiments are apparent for those skilled in the art. The general principle defined herein may be implemented in other embodiments without departing from the spirit or scope of the disclosure. Therefore, the present disclosure is not limited to the embodiments disclosed herein, but confirm to the widest scope in consistent with the principle and the novel features disclosed herein.

The invention claimed is:

1. A magnetic sensor, comprising:
a magnetic sensing element outputting a magnetic field detection signal and having a first terminal, a second terminal, a third terminal opposite to the first terminal, and a fourth terminal opposite to the second terminal;
a first discharging branch coupled between the first terminal and the third terminal;
a second discharging branch coupled between the second terminal and the fourth terminal;
wherein the first discharging branch comprises a first discharging switch and a second discharging switch which are electrically connected in series; the second discharging branch comprises a third discharging switch and a fourth discharging switch which are electrically connected in series; and wherein before the first terminal and the third terminal serve as power input terminals, the second terminal and the fourth terminal serve as magnetic field detection signal output terminals, the second discharging branch is turned on; before the first terminal and the third terminal serve as the magnetic field detection signal output terminals, the second terminal and the fourth terminal serve as power input terminals, the first discharging branch is turned on.

2. The magnetic sensor of claim 1, wherein the magnetic field detection signal comprises a magnetic field signal and an offset signal, the magnetic sensor further comprises a chopping switch to modulate the magnetic field signal and the offset signal to a high-frequency region and a baseband frequency.

3. The magnetic sensor of claim 2, wherein a first output terminal electrically connected to the third and fourth terminal, and a second output terminal electrically connected to the first and second terminal; wherein the chopping switch comprises a first switch coupled between a power source and the first terminal, a second switch coupled between the power source and the second terminal, a third switch coupled between a grounded end and the third terminal, a fourth switch coupled between the grounded end and the fourth terminal, a fifth switch coupled between the first output terminal and the fourth terminal, a sixth switch coupled the first output terminal and the third terminal, a seventh switch coupled between the second output terminal and the second terminal, and an eighth switch coupled between the second output terminal and first terminal.

4. The magnetic sensor of claim 1, wherein the first discharging switch and the second discharging switch are controlled by a first control signal and a second control signal respectively; the first control signal and the second control signal are two overlapping signals, when the first terminal and the third terminal serve as output terminals of the magnetic field signal and the second terminal and the fourth terminal serve as power input terminals, during a period that the first control signal overlaps with the second control signal, the third discharging switch and the fourth discharging switch are simultaneously turned on.

5. The magnetic sensor of claim 4, wherein when the first terminal and the third terminal serve as power input terminals and the second terminal and the fourth terminal serve as output terminals of the magnetic field signal, during a period that the first control signal overlaps with the second control signal, the first discharging switch and the second discharging switch are simultaneously turned on.

6. The magnetic sensor of claim 4, wherein the first control signal and the second control signal overlaps at a high level.

7. The magnetic sensor of claim 1, wherein the magnetic sensing element is driven by a constant current source.

8. The magnetic sensor of claim 7, further comprising a capacitor coupled between the constant current source and a grounded end.

9. The magnetic sensor of claim 8, wherein the capacitor is a MOS capacitor.

10. The magnetic sensor of claim 4, wherein the first, second, third and fourth discharging switch are MOS transistors.

11. The magnetic sensor of claim 4, wherein the first control signal and the second control signal have a frequency ranging from 100 KHz to 600 KHz.

12. A motor assembly, comprising a motor powered by an alternating-current power and the magnetic sensor according to claim 1.

13. An application apparatus comprising a motor assembly, wherein the motor assembly comprises a motor powered by an alternating-current power and the magnetic sensor according to claim 1.

14. The application apparatus according to claim 13, comprising a pump, a fan, a household appliance or a vehicle.

* * * * *